United States Patent
Matsui et al.

(10) Patent No.: US 10,908,126 B2
(45) Date of Patent: Feb. 2, 2021

(54) ULTRASONIC FLAW DETECTION DEVICE, ULTRASONIC FLAW DETECTION METHOD, METHOD OF MANUFACTURING WELDED STEEL PIPE, AND WELDED STEEL PIPE QUALITY CONTROL METHOD

(71) Applicant: JFE Steel Corporation, Tokyo (JP)

(72) Inventors: Yutaka Matsui, Tokyo (JP); Yukinori Iizuka, Tokyo (JP); Noriaki Uchitomi, Tokyo (JP); Toshihiro Miwa, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 182 days.

(21) Appl. No.: 16/318,601

(22) PCT Filed: Jul. 3, 2017

(86) PCT No.: PCT/JP2017/024280
§ 371 (c)(1),
(2) Date: Jan. 17, 2019

(87) PCT Pub. No.: WO2018/016303
PCT Pub. Date: Jan. 25, 2018

(65) Prior Publication Data
US 2019/0242854 A1    Aug. 8, 2019

(30) Foreign Application Priority Data
Jul. 20, 2016  (JP) .................. 2016-142197

(51) Int. Cl.
*G01N 29/22*   (2006.01)
*G01N 29/26*   (2006.01)
(Continued)

(52) U.S. Cl.
CPC ......... *G01N 29/221* (2013.01); *G01N 29/043* (2013.01); *G01N 29/2487* (2013.01);
(Continued)

(58) Field of Classification Search
CPC .. G01N 29/043; G01N 29/221; G01N 29/262; G01N 29/2487; G01N 2291/2634;
(Continued)

(56) References Cited

U.S. PATENT DOCUMENTS

| 4,890,268 A | 12/1989 | Smith et al. |
| 5,677,490 A | 10/1997 | Gunther et al. |
(Continued)

FOREIGN PATENT DOCUMENTS

| CN | 101017154 A | 8/2007 |
| CN | 101627303 A | 1/2010 |
(Continued)

OTHER PUBLICATIONS

Office Action dated Feb. 17, 2020, of counterpart Korean Application No. 10-2019-7000566, along with a Concise Statement of Relevance of Office Action in English.

(Continued)

*Primary Examiner* — Benjamin R Schmitt
(74) *Attorney, Agent, or Firm* — DLA Piper LLP (US)

(57) ABSTRACT

An ultrasonic flaw detection device includes: a matrix array probe; an ultrasonic wave transmitting and receiving unit that controls the matrix array probe; and an evaluation unit that detects a planar defect based on the reflected ultrasonic waves received by the ultrasonic wave transmitting and receiving unit. The matrix array probe has a plurality of vibration elements arranged lattice-like, an array pitch of the vibration elements in the pipe axis direction is larger than a wavelength of ultrasonic waves transmitted and received, widths of the vibration elements in the pipe axis direction decrease outward in the pipe axis direction from a pipe axis direction center position of the matrix array probe, and the widths and center coordinates of the vibration elements in the pipe axis direction have been adjusted such that all of (Continued)

ultrasonic waves from the vibration elements overlap in a focal position control range for the ultrasonic waves.

14 Claims, 13 Drawing Sheets

(51) Int. Cl.
    *G01N 29/04*     (2006.01)
    *G01N 29/24*     (2006.01)
    *G01N 29/265*     (2006.01)

(52) U.S. Cl.
    CPC ......... *G01N 29/262* (2013.01); *G01N 29/265* (2013.01); *G01N 2291/0289* (2013.01); *G01N 2291/106* (2013.01); *G01N 2291/267* (2013.01); *G01N 2291/2634* (2013.01); *G01N 2291/2675* (2013.01)

(58) Field of Classification Search
    CPC ....... G01N 2291/106; G01N 2291/267; G01N 29/265; G01N 2291/0289; G01N 2291/2675; G01N 29/04; G01N 29/24
    USPC .................................. 73/588, 592, 627, 640
    See application file for complete search history.

(56) References Cited

U.S. PATENT DOCUMENTS

| | | | |
|---|---|---|---|
| 5,887,122 | A | 3/1999 | Terawaki et al. |
| 2005/0081636 | A1 | 4/2005 | Barshinger et al. |
| 2008/0289425 | A1 | 11/2008 | Dijkstra et al. |
| 2010/0101326 | A1 | 4/2010 | Iizuka et al. |
| 2010/0107725 | A1 | 5/2010 | Iizuka et al. |
| 2015/0053012 | A1 | 2/2015 | Suzuki et al. |

FOREIGN PATENT DOCUMENTS

| | | |
|---|---|---|
| CN | 202372480 U | 8/2012 |
| CN | 102747726 A | 10/2012 |
| CN | 101617223 B | 7/2013 |
| CN | 104227182 A | 12/2014 |
| CN | 104475941 A | 4/2015 |
| EP | 1043584 A1 | 10/2000 |
| EP | 2652466 A2 | 10/2013 |
| JP | S61-270055 A | 11/1986 |
| JP | H02-2932 A | 1/1990 |
| JP | 2000-97918 A | 4/2000 |
| JP | 2009-018315 A | 1/2009 |
| JP | 2009-222408 A | 10/2009 |
| JP | 2012-225840 A | 11/2012 |
| JP | 2015-31637 A | 2/2015 |
| SU | 150689 A1 | 11/1961 |
| SU | 1280530 A1 | 12/1986 |
| WO | 2012/080042 A2 | 6/2012 |
| WO | 2014/007023 A1 | 1/2014 |

OTHER PUBLICATIONS

Extended European Search Report dated Jun. 14, 2019, of counterpart European Application No. 17830823.5.

Russian Search Report dated Jun. 17, 2019, of counterpart Russian Application No. 2019104693, along with a Concise Statement of Relevance in English.

Iizuka, Y. et al., "Highly Efficient Automatic Ultrasonic Inspection System for Weld Seam of UOE Pipe", *NKK Technical Review*, 2001, No. 175, pp. 36 to 40.

The First Office Action dated Nov. 4, 2020, of counterpart Chinese Application No. 201780044361.8, along with a Concise Statement of Office Action in English.

SMALL ←——————→ LARGE
REFRACTION ANGLE

ULTRASONIC FLAW DETECTION DEVICE, ULTRASONIC FLAW DETECTION METHOD, METHOD OF MANUFACTURING WELDED STEEL PIPE, AND WELDED STEEL PIPE QUALITY CONTROL METHOD

TECHNICAL FIELD

This disclosure relates to an ultrasonic flaw detection device for detection of a planar defect present at a butted portion of a groove in a welded portion of a welded steel pipe, an ultrasonic flaw detection method, a method of manufacturing a welded steel pipe, and a welded steel pipe quality control method.

BACKGROUND

Steel pipes made by electric sewing welding, steel pipes made by U-ing O-ing expansion (UOE) (steel pipes made by longitudinal submerged arc welding (LSAW)), and the like have been known as welded steel pipes manufactured by use of a welding process along a pipe axis direction. A UOE steel pipe is manufactured by press forming a steel plate into an O-shape after press forming the steel plate into a U-shape, joining butted portions of the steel plate by submerged arc welding (inner side welding and outer side welding), and performing pipe expansion. UOE steel pipes are applied to energy transport pipelines, and thus not only quality of their base materials, but also quality of their welded portions are important for safety and environmental conservation.

Quality inspection on welded portions of welded steel pipes is generally performed by use of ultrasonic flaw detection methods, and more specifically, the angle beam method and the tandem probe method (see International Publication Pamphlet No. WO 2014/007023). The angle beam method is a method of detecting a defect by using one probe and transmitting ultrasonic waves to a welded steel pipe with a refraction angle with respect to the welded steel pipe based on Snell's law, and is used for detection of any crack generated on an inner or outer surface of a shoulder portion of a welded portion. In contrast, the tandem probe method is used for detection of any defect in a thickness center portion of a welded portion (a butted portion of a groove thereof). A defect generated in a thickness center portion of a welded portion is caused by incomplete penetration, and exists as a planar defect parallel to a thickness direction of the welded portion.

When a planar defect is attempted to be detected by use of the angle beam method, since back reflection of ultrasonic waves that have hit the planar defect is weak even though these ultrasonic waves are strongly reflected in a specular reflection direction, the S/N ratio (the received-signal-intensity-to-noise-intensity ratio) becomes low. In contrast, in the tandem probe method, different probes are respectively used for transmission and reception of ultrasonic waves such that specularly reflected waves are able to be received, and these probes are arranged on the circumference of a welded steel pipe. Detection of any defect is then performed by transmission of ultrasonic waves from one of the probes, and reception of the ultrasonic waves by the other probe. When detection of any planar defect is performed by use of the tandem probe method, the S/N ratio thus becomes high as compared to when the angle beam method is used, and any planar defect is able to be detected sensitively.

The tandem probe method, however, has the following problems.

(1) Difficulty of Setting

Probes are generally set by (a) calculation of set positions of the probes by use of calculation formulae, (b) placement of the probes at the calculated set positions, and (c) adjustment of angles and the set positions of the probes by use of an artificial defect. That setting procedure is common to the angle beam method and the tandem probe method. However, since the number of probes is only one in the angle beam method, adjustment of the angle and set position of the probe is simple. In contrast, since the probes are separated between the transmission and reception of the ultrasonic waves in the tandem probe method, the angle and the set position need to be adjusted for each of the probes, and the setting work is thus complicated. Therefore, in the tandem probe method, the adjustment of the angles and set positions of the probes is very difficult.

(2) Influence of Shape of Welded Portion

When the thickness of a welded portion is equal to or less than about 20 mm, bending of the propagation path of ultrasonic waves upon reflection at the inner side or outer side of the welded portion makes it difficult for the ultrasonic waves to hit any planar defect, and the detection sensitivity for any planar defect is thus reduced.

(3) Influence of Off-Seam

Off-seam, where inner and outer side butted positions are displaced from each other upon inner side welding and outer side welding, may sometimes occur. When off-seam occurs, a planar defect may be distributed over a wide range in a circumferential direction (a pipe circumference direction) of the welded steel pipe, and thus a flaw detection method that is able to cover a wide range in the circumferential direction of the welded steel pipe is needed. However, although the tandem probe method has excellent defect detection performance near a position where ultrasonic waves for transmission and ultrasonic waves for reception intersect each other, since its range is narrow, a sufficiently wide range in the circumferential direction of the welded steel pipe is unable to be covered when off-seam occurs.

Therefore, a vertical incidence method (see "Highly Efficient Automatic Ultrasonic Inspection System for Weld Seam of UOE Pipe", IIZUKA, Yukinori, et al., NKK Technical Review, No. 175 (2001.12), pages 36 to 40) has been proposed as a method of solving those problems. The vertical incidence method is an ultrasonic flaw detection method where ultrasonic waves are caused to be vertically incident on a thickness center portion of a welded portion by use of one probe, and has the following characteristics.

(A) Setting is Easy

Since ultrasonic waves are transmitted and received by one probe, the vertical incidence method does not have the difficulty upon setting of plural probes like in the tandem probe method.

(B) There is No Influence of Shape of Welded Portion

Since the propagation path of ultrasonic waves is not changed by the shape of a welded portion, ultrasonic waves are able to be transmitted vertically to a planar defect, and the planar defect is able to be detected sensitively.

(C) Wide Detectable Range is Available in Circumferential Direction of Welded Steel Pipe Since ultrasonic waves are incident on the whole welded portion, a range covered in the circumferential direction of the welded steel pipe is wide.

However, for conditions to be satisfied, a large refraction angle of about 75° to 83° is needed, the conditions being where ultrasonic waves are vertically incident on a planar defect for the size of a welded steel pipe such as a UOE steel pipe. On the other hand, as illustrated in FIG. 14, echo height is decreased much in association with an increase in refraction angle. This is because echo transmittance of sound pressure of ultrasonic waves decreases in association with an increase in refraction angle. Further, as illustrated in FIGS. 15(a) to 15(c), since the apparent size of a sensor 10 that transmits ultrasonic waves is decreased in association with an increase in refraction angle (size D→size D'→size D"), the defect detection sensitivity is reduced by increase in diffusion attenuation factor of ultrasonic waves in association with increase in refraction angle. In FIGS. 15(a) to 15(c), a reference sign 11 represents a wedge, and a reference sign S represents a welded steel pipe. Furthermore, in online flaw detection, electric noise becomes large. Therefore, a practical size range of refraction angle is up to about 70°. Thus, in the method described in "Highly Efficient Automatic Ultrasonic Inspection System for Weld Seam of UOE Pipe", IIZUKA, Yukinori, et al., NKK Technical Review, No. 175 (2001.12), pages 36 to 40, without an increase in refraction angle, by combination of realtime digital processing (chirp wave pulse compression processing and synchronous addition and averaging processing) with the vertical incidence method, highly sensitive flaw detection is realized.

When the vertical incidence method is used, however, the defect detection sensitivity changes sensitively in relation to change in incidence angle of ultrasonic waves. The incidence angle of ultrasonic waves changes according to wobbling of mechanical parts that drive the probe and variation in acoustical anisotropy of the welded steel pipe. Therefore, the influence of the change in the incidence angle of ultrasonic waves on the defect detection sensitivity is desired to be reduced. On another front, since fine adjustment of the set angle and set position of the probe is performed manually by an operator, the defect detection sensitivity tends to vary according to personal errors of operators who preform the adjustment. Provision of a technique has thus been hoped for, the technique enabling reduction of the influence of the change in incidence angle of ultrasonic waves on the defect detection sensitivity, and the variation in the defect detection sensitivity due to the manual adjustment by an operator.

It could therefore be helpful to provide an ultrasonic flaw detection device and an ultrasonic flaw detection method that enable reduction of influence of change in incidence angle of ultrasonic waves on the defect detection sensitivity, and variation in the defect detection sensitivity due to manual adjustment by an operator. Further, it could be helpful to provide a method of manufacturing a welded steel pipe and a welded steel pipe quality control method that enable manufacture of a welded steel pipe having a welded portion that is high in quality, by reduction of influence of change in incidence angle of ultrasonic waves on defect detection sensitivity, and variation in the defect detection sensitivity due to manual adjustment by an operator.

SUMMARY

We thus provide an ultrasonic flaw detection device that detects a planar defect present at a butted portion of a groove in a welded portion of a welded steel pipe including: a matrix array probe that is arranged, via a wedge, at a position on an outer peripheral surface of the welded steel pipe, the position enabling ultrasonic waves to be vertically incident on a welding root surface, the matrix array probe configured to transmit ultrasonic waves focused in a pipe axis direction to the welding root surface, and to receive ultrasonic waves reflected at the welding root surface; an ultrasonic wave transmitting and receiving unit that controls the matrix array probe such that the matrix array probe receives the reflected ultrasonic waves reflected at the welding root surface; and an evaluation unit that detects the planar defect based on the reflected ultrasonic waves received by the ultrasonic wave transmitting and receiving unit, wherein the matrix array probe has a plurality of vibration elements arranged lattice-like, an array pitch of the vibration elements in the pipe axis direction is larger than a wavelength of ultrasonic waves transmitted and received, widths of the vibration elements in the pipe axis direction decrease outward in the pipe axis direction from a pipe axis direction center position of the matrix array probe, and the widths and center coordinates of the vibration elements in the pipe axis direction have been adjusted such that all of ultrasonic waves from the vibration elements overlap in a focal position control range for the ultrasonic waves.

In the ultrasonic flaw detection device the ultrasonic wave transmitting and receiving unit transmits ultrasonic waves to the welding root surface while changing, at a predetermined angle pitch, a refraction angle of the ultrasonic waves in a predetermined angle range around a predetermined center angle.

An ultrasonic flaw detection method includes the step of: detecting a planar defect present at a butted portion of a groove in a welded portion of a welded steel pipe by using the ultrasonic flaw detection device.

The ultrasonic flaw detection method includes the steps of: transmitting ultrasonic waves to an artificial planar defect formed at a center position of the welding root surface while changing, at an arbitrary angle pitch, a refraction angle of the ultrasonic waves in an arbitrary angle range; receiving reflected waves of the ultrasonic waves reflected at the artificial planar defect; and finding a refraction angle, at which the reflected waves of the ultrasonic waves are the highest in intensity, as the center angle.

The ultrasonic flaw detection method includes the steps of: preparing beforehand a plurality of wedges that differ in the refraction angles; and in detecting the planar defect, selecting a wedge having a refraction angle that is closest to a desired refraction angle, and using the selected wedge in combination with the matrix array probe.

A method of manufacturing a welded steel pipe includes the steps of: detecting any planar defect present at a butted portion of a groove in a welded portion of a welded steel pipe by using the ultrasonic flaw detection device; and manufacturing the welded steel pipe based on a result of the detection.

A welded steel pipe quality control method includes the steps of: detecting any planar defect present at a butted portion of a groove in a welded portion of a welded steel pipe by using the ultrasonic flaw detection device; and evaluating quality of the welded steel pipe based on a result of the detection.

Our ultrasonic flaw detection device and ultrasonic flaw detection method enable reduction of influence of change in incidence angle of ultrasonic waves on the defect detection sensitivity, and variation in the defect detection sensitivity due to manual adjustment by an operator. Further, our method of manufacturing a welded steel pipe and a welded steel pipe quality control method enable manufacture of a welded steel pipe having a welded portion that is high in quality, by reduction of influence of change in incidence angle of ultrasonic waves on defect detection sensitivity, and variation in the defect detection sensitivity due to manual adjustment by an operator.

REFERENCE SIGNS LIST

Figure 1:
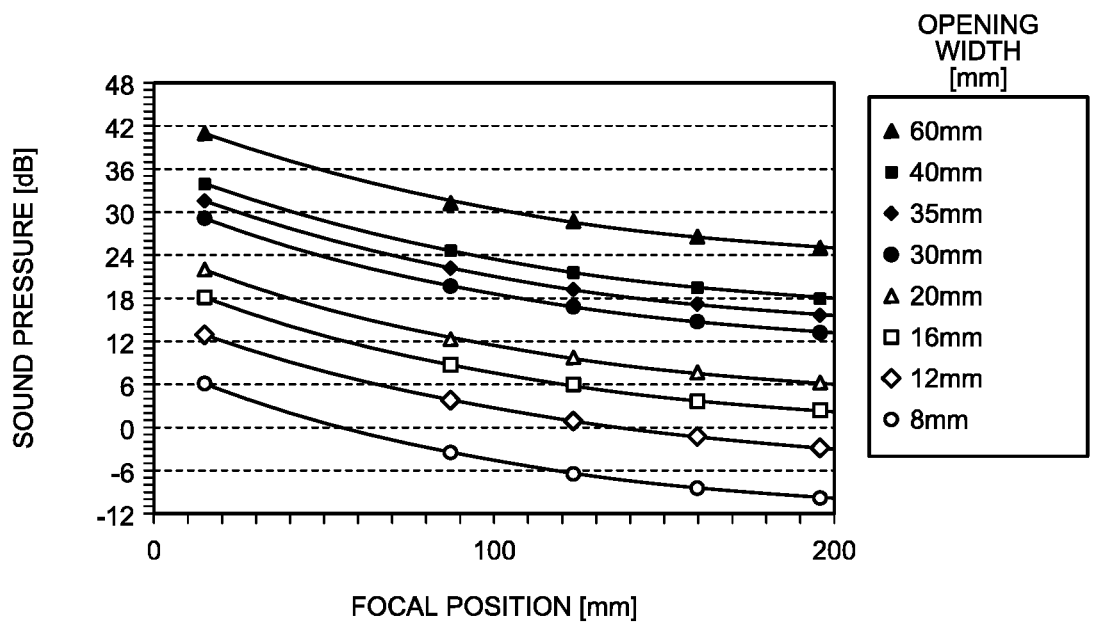
FIG. 1 is a diagram illustrating an example of results of calculation of a relation between opening widths of matrix array probes and sound pressure increasing effects at focal positions.

1 Ultrasonic flaw detection device
2 Matrix array probe
3 Wedge
4 Ultrasonic wave transmitting and receiving unit
5 Evaluation unit
S Welded steel pipe

DETAILED DESCRIPTION

Focusing of Ultrasonic Waves in Pipe Axis Direction

In an ultrasonic flaw detection method where the vertical incidence method is used, ultrasonic waves are focused in a pipe axis direction for realization of a high S/N ratio by compensation of reduction in the defect detection sensitivity at a high refraction angle. Specifically, the defect detection sensitivity when the refraction angle of ultrasonic waves is 80° is 12 dB lower than the defect detection sensitivity when the refraction angle of ultrasonic waves is 70°. Therefore, when the refraction angle of ultrasonic waves is 80°, the defect detection sensitivity is increased by at least 12 dB or more through focusing of the ultrasonic waves in the pipe axis direction.

Effects of the increase in the defect detection sensitivity obtained by the focusing of the ultrasonic waves in the pipe axis direction are able to be evaluated by use of Equation (1) below. Specifically, from Equation (1), a sound pressure near a focus upon focusing of ultrasonic waves is able to be calculated. In Equation (1), P represents sound pressure near a focal position of ultrasonic waves, $P_0$ represents transmission sound pressure, x represents position of a sound axis field, $f_{op}$ represents focal distance, D represents size of a sensor that transmits the ultrasonic waves, λ represents wavelength of the ultrasonic waves, and J represents a focusing coefficient. The focusing coefficient J is defined by Equation (2). However, if $x=f_{op}$ in Equation (1), sound pressure is calculated as $P/P_0=\pi J$.

$$\frac{P}{P_o} = \frac{2\sin\left[\frac{\pi}{2}J\frac{f_{op}}{x}\left[1-\frac{x}{f_{op}}\right]\right]}{1-\frac{x}{f_{op}}} \qquad (1)$$

$$J = \frac{D^2}{4\lambda f_{op}} \qquad (2)$$

FIG. 1 illustrates results of calculation of a relation between pipe axis direction widths (opening widths) of sensors that transmit ultrasonic waves and sound pressure of the ultrasonic waves at focal positions, where the sound velocity in the wedge is 2340 m/sec, the sound velocity of shear waves in the steel is 3230 m/sec, and the height of the wedge is 25 mm. Specifically, FIG. 1 illustrates the sound pressure at a focal position P3 in FIG. 4 described later. FIG. 1 illustrates change in sound pressure over focal positions for each opening width, with the sound pressure by an ultrasonic probe having a vibrator size (an opening width) of 8 mm without focusing being a reference (that is, 0 dB). As illustrated in FIG. 1, the greater the opening width of the sensor becomes, the stronger the sound pressure obtained at the focal position is. Specifically, FIG. 1 illustrates that to obtain a strong sound pressure equal to or larger than 12 dB at a focal position reached after transmission through steel when the focal position is 40 mm to 160 mm, an opening width of about 30 mm is needed. On another front, for sufficient sector scanning, vibration elements (also called vibrators) of at least 8ch or more are desirably used. Therefore, when a matrix array probe of 128ch is used as a sensor, preferably: vibration elements forming the sensor are in an array of 16ch×8ch; there are 16ch in the pipe axis direction because a large opening width like 30 mm is needed to obtain a sufficient defect detection sensitivity increasing effect in the pipe axis direction, in which the ultrasonic waves are focused; and there are 8ch in a pipe circumference direction, in which sector scanning is performed.

On the other hand, in a phased array type ultrasonic flaw detection method, grating lobes that are unnecessary signal peaks are generated, and become a cause of noise. Therefore, grating lobes are desirably generated as little as possible. Equation (3) below is generally known as a condition for an array pitch (a vibration element pitch) Ep of vibration elements for no generation of grating lobes. In Equation (3), λ represents wavelength of ultrasonic waves, and θ represents polarization angle. The phased array type is a method where, by transmission and reception of ultrasonic waves delayed in phase from vibration elements arranged in an array, (i) a transmission direction and a reception direction of the ultrasonic waves are able to be controlled, (ii) the ultrasonic waves are able to be focused, and (iii) electronic scanning is possible without mechanical scanning of positions of the vibration elements.

$$Ep \le \frac{\lambda}{1+\sin\theta} \quad (3)$$

When the sound velocity in the wedge is 2340 m/sec, the frequency of ultrasonic waves is 5 MHz, which is generally used in welded steel pipe flaw detection, and the polarization angle with respect to the pipe axis direction is 0°. According to Equation (3) above, the vibration element pitch Ep for no generation of grating lobes is found to be about 0.46 mm. That is, when the vibration element pitch Ep is equal to or less than 0.46 mm, grating lobes will not be generated.

However, even if the vibration elements of 16ch are arranged in the pipe axis direction at a vibration element pitch Ep of 0.46 mm, the opening width of the matrix array probe in the pipe axis direction will only be 7.36 mm (=0.46 mm×16ch). As described already, the opening width of the matrix array probe in the pipe axis direction needs to be of a large opening of 35 mm or the like for compensation of reduction in the defect detection sensitivity at a high refraction angle by focusing of ultrasonic waves, and thus the opening width of 7.36 mm is not sufficient.

Therefore, arrangement positions of the vibration elements in the pipe axis direction when the vibration element pitch Ep is larger than the wavelength λ of ultrasonic waves will be discussed. For N vibration elements to form a preset opening width W, the vibration element pitch Ep must be W/N. A vibration element width Ew is of course less than the vibration element pitch Ep. If the vibration element pitch Ep is larger than the wavelength λ of ultrasonic waves, the vibration element width Ew is preferably made as large as possible in relation to the vibration element pitch Ep. Grating lobes are thereby reduced. Specifically, to make grating lobes equal to or less than −12 dB in relation to the main lobe, the vibration element pitch Ep and the vibration element width Ew are designed such that Ew/Ep≥0.84, and to make grating lobes equal to or less than −18 dB, the vibration element pitch Ep and the vibration element width Ew are designed such that Ew/Ep≥0.94.

If the vibration element width Ew is increased, however, the directivity angle of the vibration element is narrowed, and the directivity angles of the vibration elements will overlap one another farther from the plane where the vibration elements are arranged. In this example, at a side close to the arrangement positions of the vibration elements, the directivity angles of the vibration elements do not overlap one another, and it will thus be difficult for ultrasound waves to be focused sufficiently. On the contrary, if the vibration element width Ew of a vibration element is decreased, the directivity angle of the vibration element is widened, and thus the directivity angles of the vibration elements overlap one another at a side closer to the plane where the vibration elements are arranged. Thereby, as compared to when the vibration element width Ew is wide, ultrasonic waves are able to be focused nearer, but it becomes easier for grating lobes to be generated.

Figure 2:
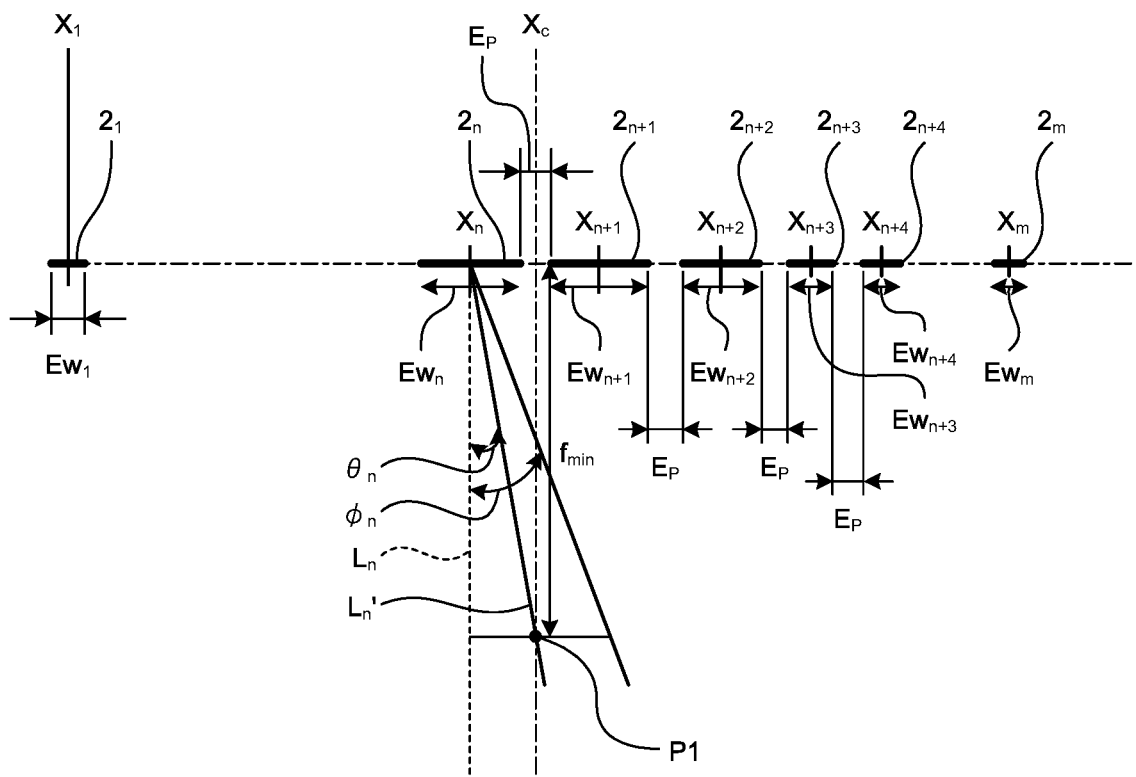
FIG. 2 is a diagram explaining a configuration of vibration elements in a pipe axis direction.

Thus, ultrasonic flaw detection is performed by use of a matrix array probe having vibration elements arranged as illustrated in FIG. 2. In the matrix array probe illustrated in FIG. 2, vibration elements $2_n$ and $2_{n+1}$ having the largest vibration element width Ew are arranged at a center position ($X=X_c$) along a pipe axis direction (an X-direction) thereof, and the vibration elements gradually decrease in their vibration element widths Ew outward from the center position ($X=X_c$) along the pipe axis direction. In FIG. 2, the center coordinate of the n-th (where n=1 to m) vibration element is $X_n$, the vibration element width thereof is $Ew_n$, and the vibration element pitch is Ep. A directivity angle $\phi_n$ of the vibration element $2_n$ arranged at the n-th position is able to be calculated by Equation (4) below.

$$\phi_n = 29\frac{\lambda}{Ew_n} \quad (4)$$

When a distance from the center position ($X=X_c$) to the nearest focal position P1 in flaw detection is a focal distance for ultrasonic waves transmitted from the vibration elements to overlap one another sufficiently from the focal distance $f_{min}$, and a wide focal position range to be realized; a vibration element width $Ew_n$ and a center coordinate $X_n$ satisfying Equation (5) below may be calculated, and each vibration element may be placed at the calculated position.

$$\phi_n \ge \theta_n \quad (5)$$

In Equation (5), an angle $\theta_n$ is an angle formed between a normal line $L_n$ passing through the center coordinate $X_n$ of the n-th vibration element $2_n$ and a line segment $L_n'$ joining the center coordinate $X_n$ of the n-th vibration element $2_n$ and the focal position P1, and is able to be calculated by Equation (6) below. If the directivity angle $\phi_n$ of the n-th vibration element $2_n$ is larger than this angle $\theta_n$, ultrasonic waves will sufficiently overlap one another from the focal position P1. Generation of grating lobes and reduction in the defect detection sensitivity at a high refraction angle are thereby able to be reduced. In Equation (6), $X_c$ represents the center position of the matrix array probe. Moreover, the value of the vibration element pitch Ep is desirably made as small as possible.

$$\theta_n = \tan^{-1}\left(\frac{\text{abs}(X_n - X_c)}{f_{min}}\right) \quad (6)$$

Figure 3:
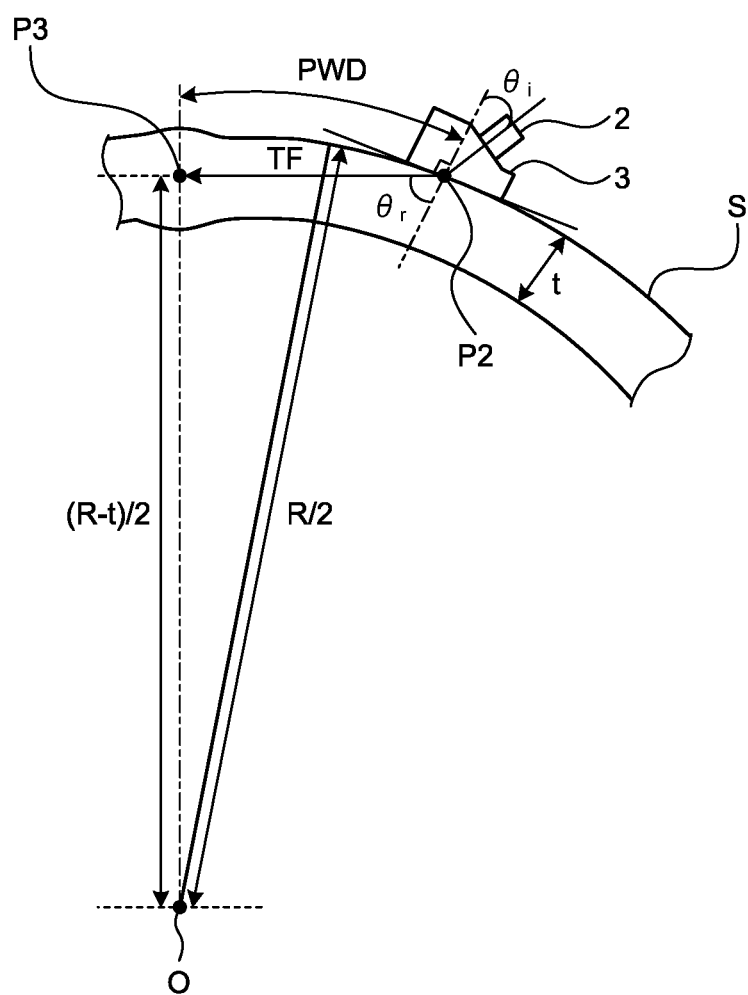
FIG. 3 is a diagram explaining a set position of a matrix array probe.

A set position for a matrix array probe 2 in ultrasonic flaw detection illustrated in FIG. 3 is able to be calculated from Equations (7) and (8) below by use of a thickness t and an outer diameter R of a welded steel pipe S. In Equation (8), PWD represents, as illustrated in FIG. 3, a distance on the circumference of the welded steel pipe S, from an incident position P2 of ultrasonic waves to a focal position (the butted position of the groove) P3 where a defect is present. Further, a distance TF, over which the ultrasound waves are propagated through the steel is able to be calculated by Equation (9) below. Furthermore, when the height of a wedge 3 is H, the sound velocity in the wedge 3 is Vw, and the sound velocity of shear waves in the steel is Vs; a focal distance $f_p$ of the ultrasonic waves is able to be calculated by Equation (10) below. In FIG. 3, $\theta_i$ represents the incidence angle of the ultrasonic waves, $\theta_r$ represents the refraction angle of the ultrasonic waves, and O represents the center position of the welded steel pipe S.

$$\theta_r = \sin^{-1}\left(1 - \frac{t}{R}\right) \quad (7)$$

$$PWD = \left(\frac{\pi}{2} - \theta_r\right) \cdot \frac{R}{2} \qquad (8)$$

$$TF = \frac{1}{2}\sqrt{R^2 - (R-t)^2} \qquad (9)$$

$$f_p = H + TF \times \frac{Vs}{Vw} \qquad (10)$$

Figure 4:
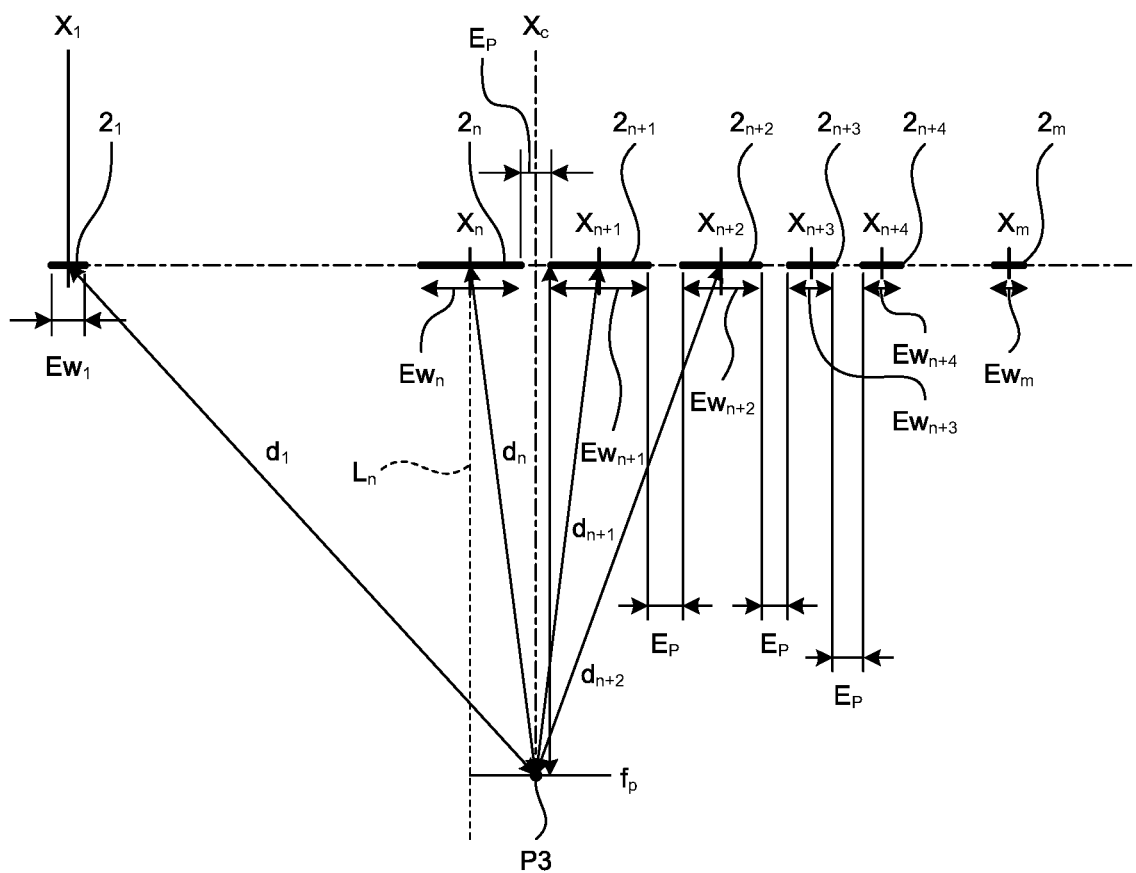
FIG. 4 is a diagram explaining a method of calculating timing for transmission of ultrasonic waves from each vibration element.

Next, a method of calculating timing for transmission of ultrasonic waves from vibration elements to focus the ultrasonic waves on the focal position P3 will be described by use of FIG. 4. As illustrated in FIG. 4, to focus ultrasonic waves on the focal position P3, first, a propagation time of ultrasonic waves from an arrangement position of each vibration element to the focal position P3 is calculated. Specifically, as expressed by Equation (11) below, through division of a distance $d_n$ from the arrangement position of the n-th vibration element to the focal position P3 by the sound velocity Vw in the wedge, a propagation time $T_n$ from the arrangement position of the n-th vibration element to the focal position P3 is able to be found.

$$T_n = d_n/Vw \qquad (11)$$

As in FIG. 4, if m vibration elements have been arranged in the pipe axis direction, by the above described calculation for each of the first to the m-th vibration elements, the propagation time $T_n$ is found. Subsequently, as expressed by Equation (12) below, the maximum value (the maximum propagation time) $T_{max}$ of the propagation time $T_n$ found for each vibration element is calculated. As expressed by Equation (13) below, by subtraction of the maximum propagation time $T_{max}$ from each propagation time $T_n$, an absolute time of a result of the subtraction is found as a timing (a delay time $Td_n$) for transmission of ultrasonic waves by each vibration element. Ultrasonic waves are thereby able to be focused on the focal position P3.

$$T_{max} = \max(d_1, d_2, \ldots d_n, \ldots d_m) \qquad (12)$$

$$Td_n = \text{abs}(T_n - T_{max}) \qquad (13)$$

Figures 15A, 15B, 15C:
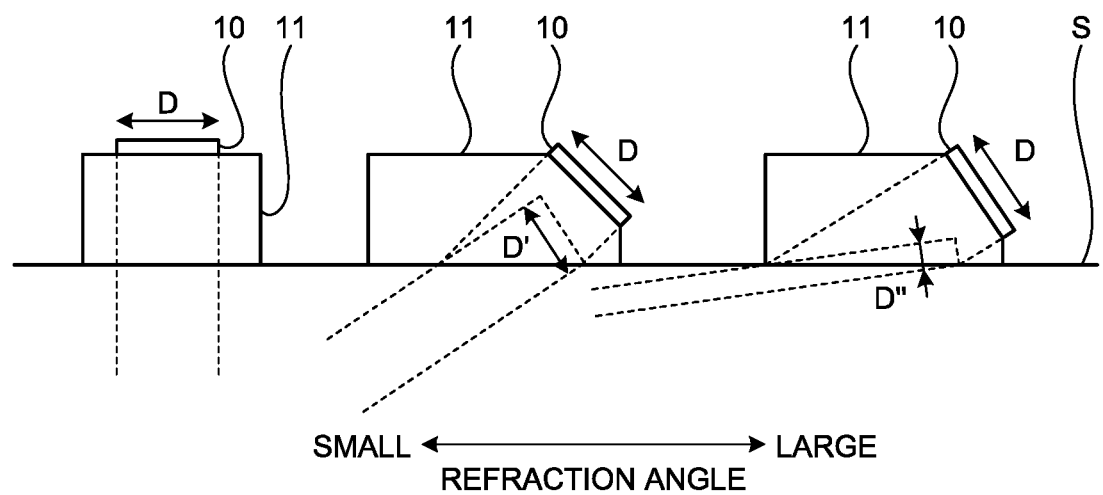
FIGS. 15(a), 15(b) and 15(c) are diagrams explaining a relation between refraction angles of ultrasonic waves and apparent sensor sizes.

Focusing ultrasonic waves in a radial cross section direction (a C-direction) of the welded steel pipe orthogonal to the pipe axis direction may be considered also, but as illustrated in FIGS. 15(a) to 15(c), a sensor (an ultrasonic probe) that transmits ultrasonic waves decreases in its apparent size in association with increase in the refraction angle. Further, as expressed by Equation (2), the focusing coefficient J is proportional to a squared value of the size of the sensor that transmits the ultrasonic waves. Therefore, in this example, to obtain sufficient sound pressure, the size of the sensor that transmits the ultrasonic waves needs to be increased, and thus this focusing is not realistic. Specifically, if the frequency is 5 MHz, the size of a sensor for transmission needs to be, for example, equal to or larger than 50 mm. If a sensor having such a large opening width in the C-direction is attempted to be applied, the minimum allowable proximity will be increased and the propagation distance of ultrasonic waves will be increased, and as a result, the sound pressure increasing effect by the focusing will not be obtained sufficiently. Therefore, this focusing is not very realistic. Therefore, ultrasonic waves are focused in a pipe axis direction, rather than along a radial cross section direction of a welded steel pipe orthogonal to the pipe axis direction.

Ultrasonic Flaw Detection Process

Figure 5:
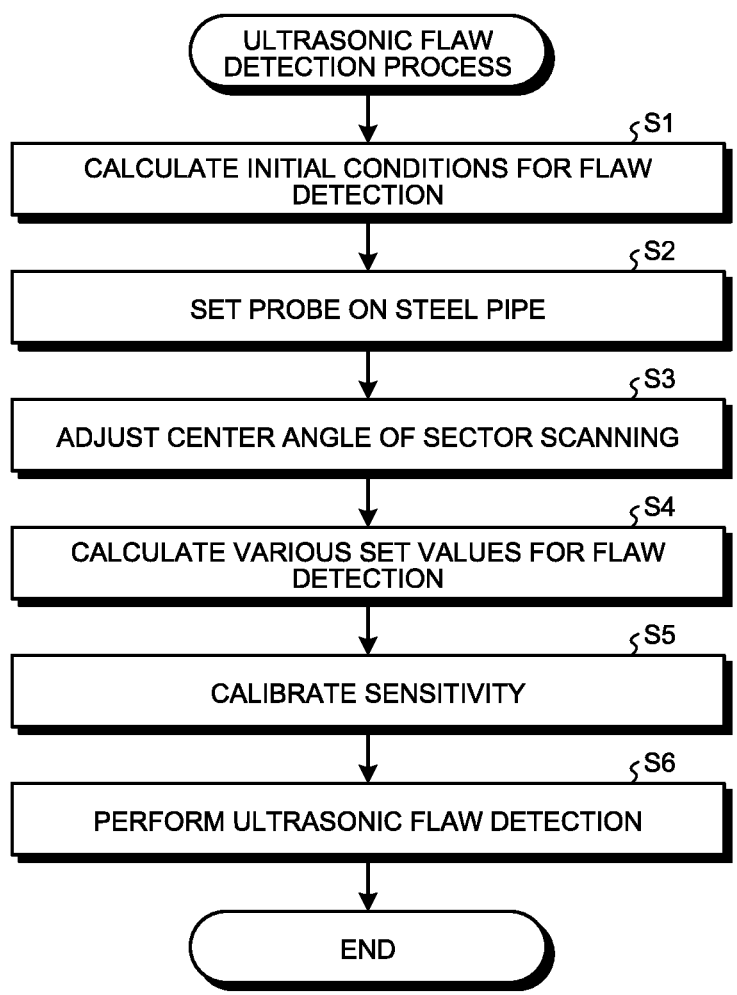
FIG. 5 is a flow chart illustrating a flow of an ultrasonic flaw detection process according to an example.

An ultrasonic flaw detection process is desirably executed after sensitivity calibration of a matrix array probe is performed by adjustment of an incidence angle condition and a focusing condition of ultrasonic waves through use of a test piece for calibration having an artificial planar defect formed at a butted portion of a groove. Specifically, an ultrasonic flaw detection process is performed according to a flow illustrated in FIG. 5. As illustrated in FIG. 5, in the ultrasonic flaw detection process, first, initial conditions for ultrasonic flaw detection are calculated (Step S1). Specifically, the set position (the incident position) P2 for vertical incidence of ultrasonic waves on the center position $X_c$ of a welding root surface, and a delay time of each vibration element for flaw detection with the ultrasonic waves being focused in the pipe axis direction and the incidence angle of the ultrasonic waves being swinged in the C-direction, are calculated. In this calculation, the focal position P3 of the ultrasonic waves is able to be calculated from the position of the artificial planar defect, the incidence position of the ultrasonic waves, and the set position of the matrix array probe. Subsequently, the matrix array probe and wedge (probe) are set on an outer peripheral surface of the welded steel pipe such that ultrasonic waves are able to be incident on the incident position P2 calculated in the processing of Step S1 (Step S2).

Figure 6A:
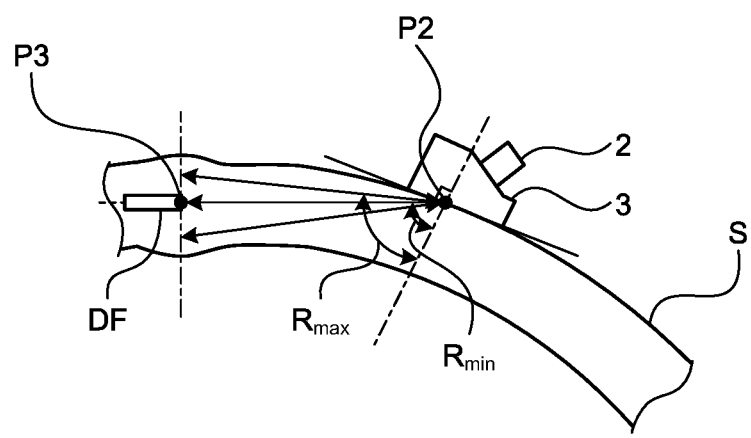
FIGS. 6(a) and 6(b) are diagrams explaining a method of calculating a center angle of sector scanning.
Figure 6B:
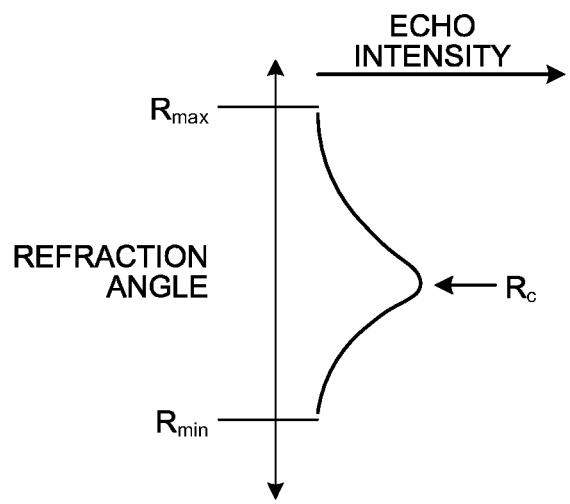

Subsequently, ultrasonic waves that have been focused in the pipe axis direction with the calculated delay times of the vibration elements are transmitted and received while the incidence angle is swinged in the C-direction (Step S3). Specifically, as illustrated in FIGS. 6(a) and 6(b), scanning (sector scanning) with ultrasonic waves is performed at an angle pitch Rd of, for example, 1°, over an angle range from a refraction angle $R_{min}$ to a refraction angle $R_{max}$, the echo intensity from the defect at each angle is recorded, and a refraction angle, at which the echo intensity is the highest, is detected as a center angle $R_c$ of flaw detection. In FIGS. 6(a) and 6(b), DF represents the artificial planar defect. Subsequently, various set values for ultrasonic flaw detection are calculated (Step S4), and the sensitivity of each vibration element is calibrated according to the various set values calculated such that the intensity of an output signal of the vibration element is within a predetermined range (Step S5). Thereafter, ultrasonic flaw detection is performed by scanning at refraction angles at a predetermined angle pitch of, for example, 2°, in a predetermined angle range of, for example, ±4°, around the center angle $R_c$ determined in the processing of Step S3 (Step S6). The angle range and the angle pitch of the sector scanning are determined by an operator, according to variables such as the pipe diameter and thickness of the welded steel pipe, the acoustical anisotropy of the welded steel pipe, and the frequency of ultrasonic waves used.

By ultrasonic flaw detection through scanning at refraction angles at a predetermined angle pitch in a predetermined angle range around the center angle $R_c$ as described above, ultrasonic waves are able to be made incident on the welding root surface even if the incidence angle of the ultrasonic waves is somewhat changed due to wobbling of the mechanical parts that drive the vibration elements and variation in the acoustical anisotropy of the welded steel pipe, and thus influence of the change in the incidence angle of the ultrasonic waves on the defect detection sensitivity is able to be reduced. Further, since the refraction angle, at which the echo intensity is the highest, is set as the center angle $R_c$ of flaw detection, variation in the defect detection sensitivity according to the personal error of the operator who adjusts the angle and set position of the probe is able to be reduced.

Configuration of Ultrasonic Flaw Detection Device

Figure 7:
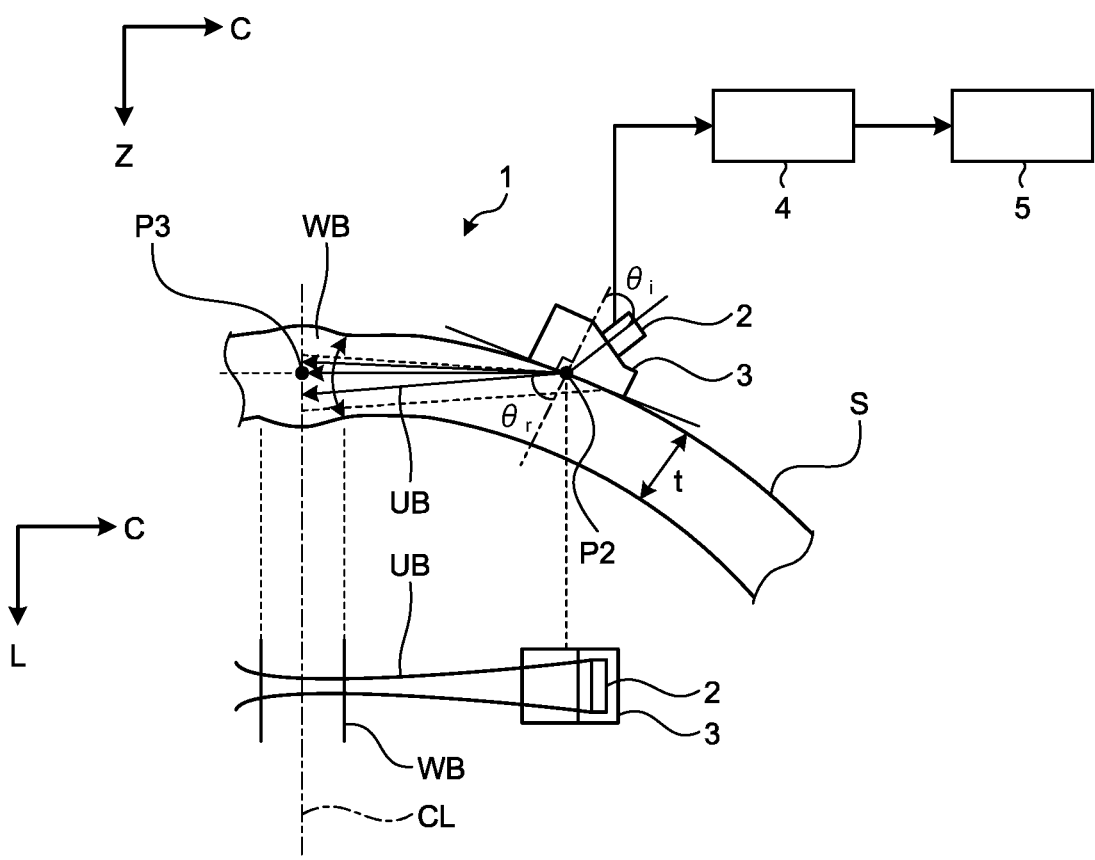
FIG. 7 is a schematic diagram illustrating a configuration of an ultrasonic flaw detection device according to the example.
Figure 8:
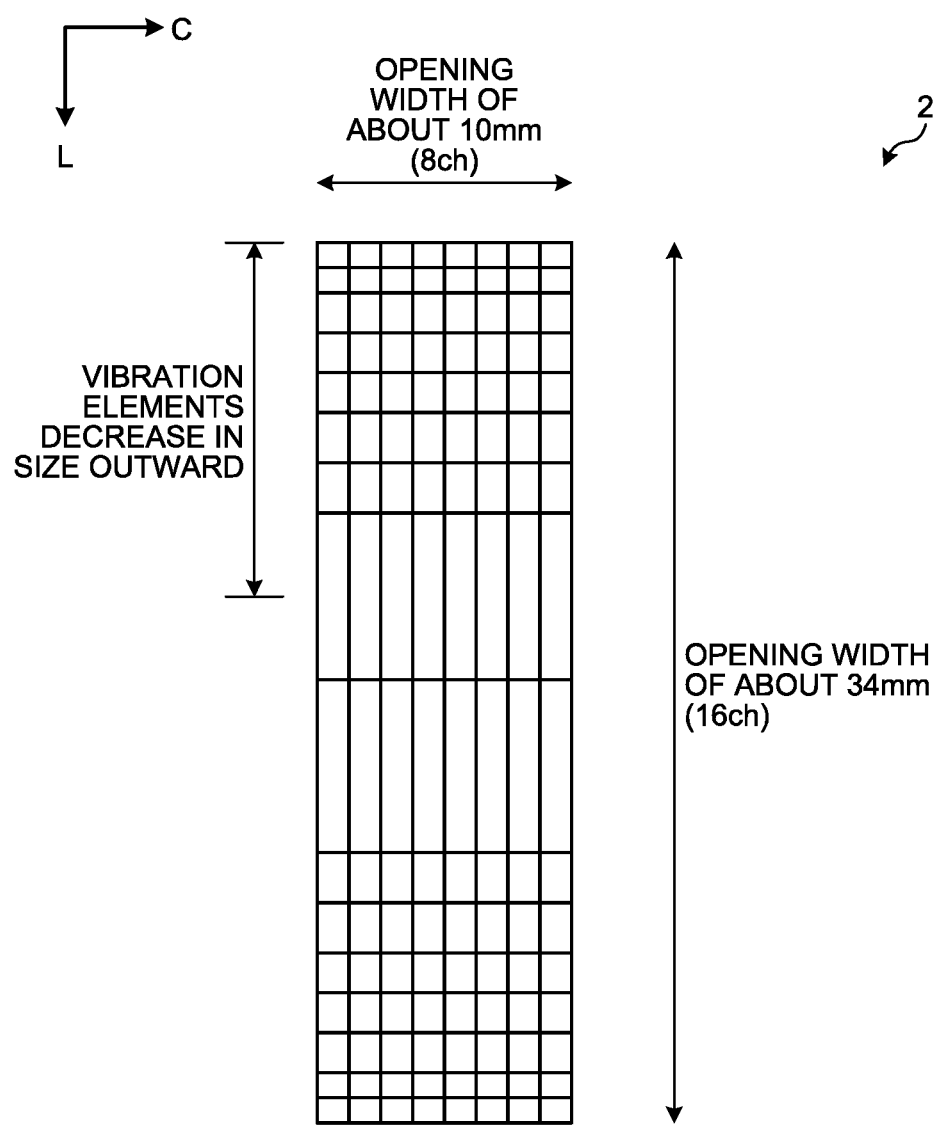
FIG. 8 is a plan view illustrating a configuration of the matrix array probe illustrated in FIG. 7.

Next, with reference to FIGS. 7 and 8, a configuration of an ultrasonic flaw detection device according to the example will be described. FIG. 7 is a schematic diagram illustrating the configuration of the ultrasonic flaw detection device according to the example. FIG. 8 is a plan view illustrating a configuration of a matrix array probe illustrated in FIG. 7. In FIGS. 7 and 8, an L-direction represents a pipe axis direction, the C-direction represents a direction orthogonal to the pipe axis direction on a horizontal plane, and a Z-direction represents a direction orthogonal to the L-direction and C-direction.

As illustrated in FIG. 7, an ultrasonic flaw detection device 1 according to the example includes, as main components thereof, the matrix array probe 2, the wedge 3, an ultrasonic wave transmitting and receiving unit 4, and an evaluation unit 5.

The matrix array probe 2 is on an outer surface of the welded steel pipe S to be inspected, and transmits and receives ultrasonic waves UB to and from the welded steel pipe S via the wedge 3. As illustrated in FIG. 8, according to this example, the matrix array probe 2 is formed of vibration elements of 128ch arranged lattice-like, and vibration elements of 16ch are arranged in the L-direction and vibration elements of 8ch are arranged in the C-direction. Vibration element widths of these vibration elements are designed to gradually decrease outward from the center position along the L-direction, and the vibration element width Ew and the center coordinate $X_n$ of each vibration element are designed to satisfy Equation (5) above. Thereby, according to this example, the opening width of the matrix array probe 2 in the L-direction is about 34 mm, and the opening width in the C-direction is about 10 mm.

The wedge 3 is formed as a polyhedron having an installation surface where the matrix array probe 2 is installed, and is formed of polystyrene. According to this example, ultrasonic flaw detection is performed by: setting the sound velocity in the wedge 3 to 2340 m/sec; preparing a plurality of the wedges 3, by which the refraction angles of ultrasonic waves respectively become 60°, 65°, 70°, and 80°; and attaching the wedge 3 having the refraction angle that is closest to a theoretically calculated refraction angle $\theta_r$ from the incident position P2 of the ultrasonic waves UB. For example, when a thickness center portion of a welded portion of a welded steel pipe S having an outer diameter of 1067 mm and a thickness of 44.5 mm is subjected to flaw detection, a refraction angle $\theta_r$ of the ultrasonic waves UB from the incident position P2 is calculated to be 73.4° when the sound velocity of shear waves in the steel is 3230 m/sec. In this example, ultrasonic flaw detection is thus performed by attachment of the wedge 3, by which the refraction angle $\theta_r$ of the ultrasonic waves UB becomes 75°, to the matrix array probe 2. According to this example, a thickness center portion of a welded portion is subjected to flaw detection, but a flaw detection range is not limited to a thickness center portion of a welded portion, and any planar defect in a range irradiated with ultrasonic waves may be subjected to flaw detection.

The ultrasonic wave transmitting and receiving unit 4 controls the ultrasonic flaw detection process for a welded portion of the welded steel pipe S according to the ultrasonic flaw detection process illustrated in FIG. 5 by outputting transmission and reception commands for ultrasonic wave signals to the vibration elements included in the matrix array probe 2. Specifically, the ultrasonic wave transmitting and receiving unit 4 is formed of an information processing device such as a microcomputer, and executes the ultrasonic flaw detection process for a welded portion of the welded steel pipe S by executing a computer program prescribing the ultrasonic flaw detection process illustrated in FIG. 5. The ultrasonic wave transmitting and receiving unit 4 outputs ultrasonic wave signals reflected from the welded seam portion and received by the matrix array probe 2, to the evaluation unit 5. In FIG. 7, WB represents welding bead, CL represents the center position of the welded portion with respect to a circumferential direction of the welded steel pipe S, and P3 represents the focal position.

After performing predetermined processing on the ultrasonic wave signals output from the ultrasonic wave transmitting and receiving unit 4, the evaluation unit 5 executes, based on the ultrasonic wave signals that have been subjected to the predetermined processing, quality evaluation of the welded portion of the welded steel pipe such as determination of whether or not any defect is present in the welded portion. Specifically, the evaluation unit 5 determines whether or not the intensity of the ultrasonic wave signals is equal to or larger than a predetermined threshold, and if the intensity of the ultrasonic wave signals is equal to or larger than the predetermined threshold, the evaluation unit 5 determines that a defect is present in the welded portion. The evaluation unit 5 provides information related to a result of the quality evaluation for the welded portion of the welded steel pipe, to an operator, by outputting and recording the result of the quality evaluation for the welded portion of the welded steel pipe. A position where the defect has been detected is marked for the welded steel pipe having the defect detected in the welded portion. The welded steel pipe that has been marked is sent to an inspection process that is manually performed, and an operator performs ultrasonic flaw detection around the marked portion again and performs final judgement of acceptance for the quality of the welded portion. The ultrasonic flaw detection device 1 according to the example is also used in this manual inspection by the inspector.

EXAMPLE

Figure 9:
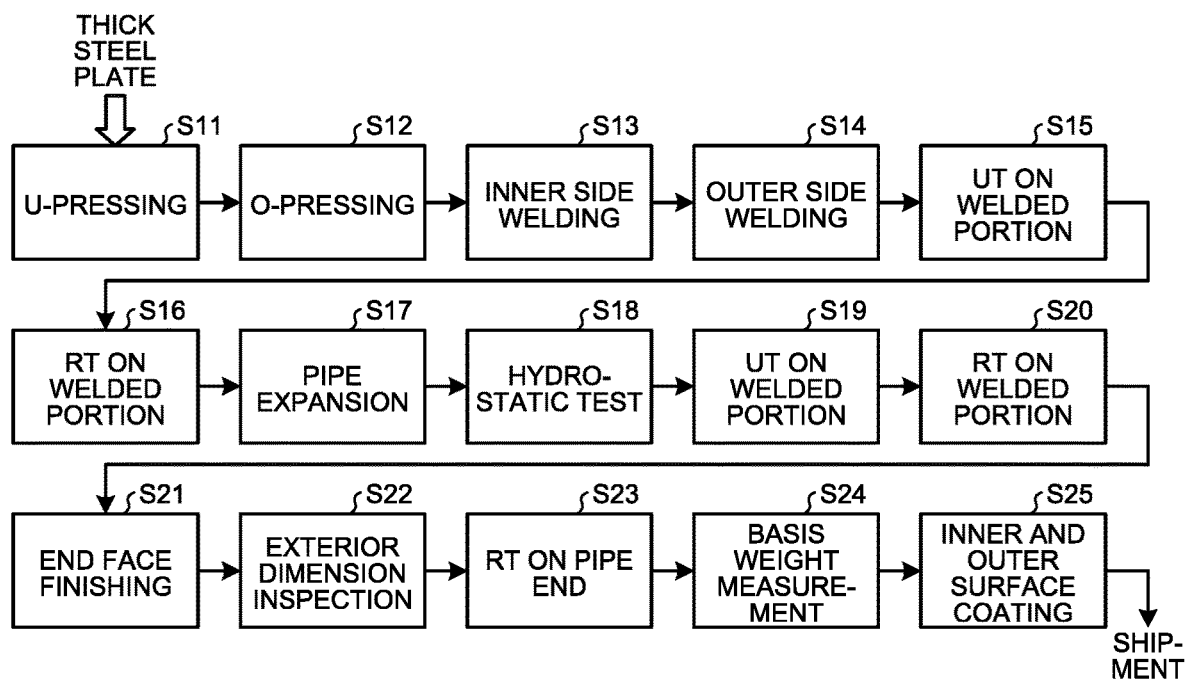
FIG. 9 is a diagram illustrating a flow of a general UOE steel pipe manufacturing process.

In an example, quality of a welded portion of a UOE steel pipe was evaluated by use of the ultrasonic flaw detection device 1. Specifically, the ultrasonic flaw detection device 1 was applied to a general manufacturing process for UOE steel pipes illustrated in FIG. 9. In the manufacturing process for UOE steel pipes illustrated in FIG. 9, first, after U-ing press forming and O-ing press forming on a thick steel plate are performed (Steps S11 and S12), an inner side and an outer side of butted portions of the thick steel plate are weld-bonded (Steps S13 and S14), and ultrasonic testing (UT) and radiographic testing (RT) on the welded portion are executed (Steps S15 and S16). Subsequently, after a pipe expansion process is performed on the welded steel pipe (Step S17), a hydrostatic test is performed thereon (Step S18), and ultrasonic testing (UT) and radiographic testing (RT) are executed again on the welded portion (Steps S19 and S20). Finally, after an end face finishing process, an exterior dimension inspection process, pipe end radiographic testing, a basis weight measurement process, and an inner and outer surface coating process are performed on the welded steel pipe (Steps S21 to S25), the welded steel pipe is shipped. In this example, the ultrasonic flaw detection device 1 was applied to the ultrasonic testing at Step S15 and Step S19.

Figure 10:
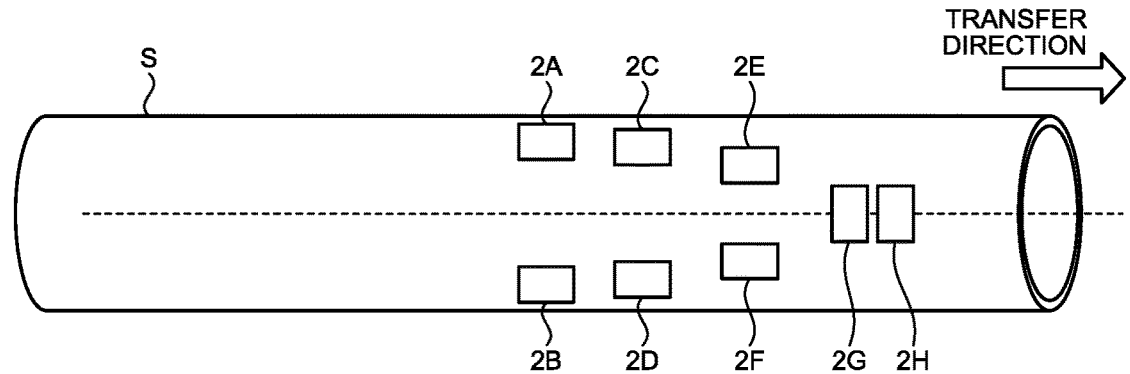
FIG. 10 is a schematic diagram illustrating arrangement positions of plural matrix array probes included in a manipulator.

Further, in this example, a manipulator including plural matrix array probes 2A to 2H as illustrated in FIG. 10 was installed in the ultrasonic flaw detection device. These matrix array probes are respectively assigned with roles such that the matrix array probes 2A and 2B are for flaw detection on a thickness center portion, the matrix array probes 2C and 2D are for flaw detection on an outer surface, the matrix array probes 2E and 2F are for flaw detection on an inner surface, and the matrix array probes 2G and 2H are for flaw detection on a bead portion. The manipulator puts each matrix array probe on the welded steel pipe S, and ultrasonic testing on the welded portion is performed while the welded steel pipe S is transferred in a longitudinal direction (a transfer direction). In this example, among the matrix array probes 2A to 2H, the example illustrated in FIG. 7 was applied to the matrix array probes 2A and 2B for flaw detection on a thickness center portion, and the angle beam phased array UT technique was applied to the other matrix array probes.

Figure 11A:
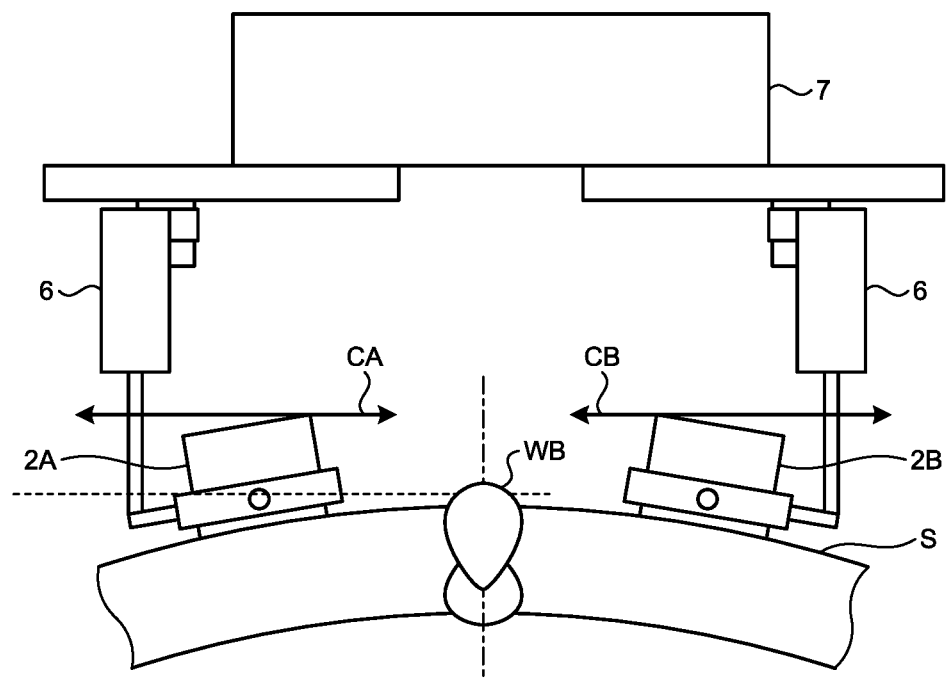
FIGS. 11(a) and 11(b) are schematic diagrams illustrating a configuration of matrix array probes for flaw detection on a thickness center portion.
Figure 11B:
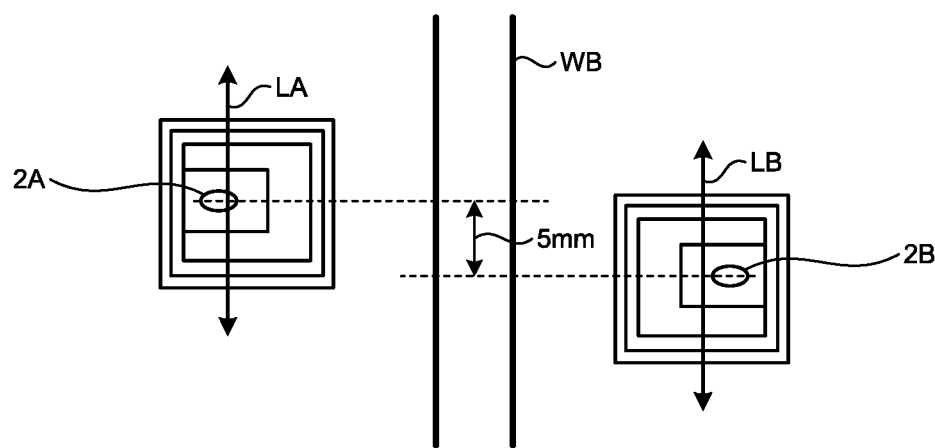

Details of a configuration of the matrix array probes 2A and 2B for flaw detection on a thickness center portion will now be described by use of FIGS. 11(a) and 11(b). As also illustrated in FIG. 10, the plural matrix array probes 2A to 2H are arranged to perform flaw detection, for each part to be subjected to ultrasonic flaw detection from both sides, with the welding bead WB interposed therebetween. The matrix array probes 2A and 2B for flaw detection on a thickness center portion are similarly arranged, as illustrated in FIGS. 11(a) and 11(b), to perform flaw detection from both sides, with the welding bead WB interposed therebetween. Further, as illustrated in FIG. 11(b), the matrix array probes 2A and 2B forming a pair are arranged to be displaced from each other by about 5 mm along the pipe axis direction. When the vertical incidence method is applied, transmissively propagated waves of ultrasonic waves transmitted from the matrix array probes 2A and 2B forming a pair become noise and the detectability is thereby reduced. Therefore, the matrix array probes 2A and 2B forming a pair were arranged to be displaced from each other in the pipe axis direction.

Further, in this example, ultrasonic waves were transmitted and received as focused beams. Furthermore, the matrix array probes 2A and 2B each having an opening width of about 34 mm in the pipe axis direction and an opening width of 5 mm to 18 mm in the pipe circumference direction were used, and their beam widths were made to be equal to or less than 1 mm at minimum. Therefore, it is difficult for ultrasonic waves to be adapted to the position of the artificial flaw at the time of adjustment of sensitivity. Thus, a mechanism, enabling the matrix array probes including the matrix array probes 2A and 2B for flaw detection on a thickness center portion to be precisely scanned individually in the pipe axis direction, was provided. Specifically, as illustrated in FIG. 11(a), each matrix array probe was connected to a manipulator 7 via a scanning mechanism 6, and the matrix array probe was made movable by the scanning mechanism 6 in an L-direction LA or LB and a C-direction CA or CB. The opening width in the pipe circumference direction is changed according to: a sector scanning condition such as a condition enabling a range of ⅓ of the thickness to be irradiated with ultrasonic waves; and the beam diameter.

Figure 12A:
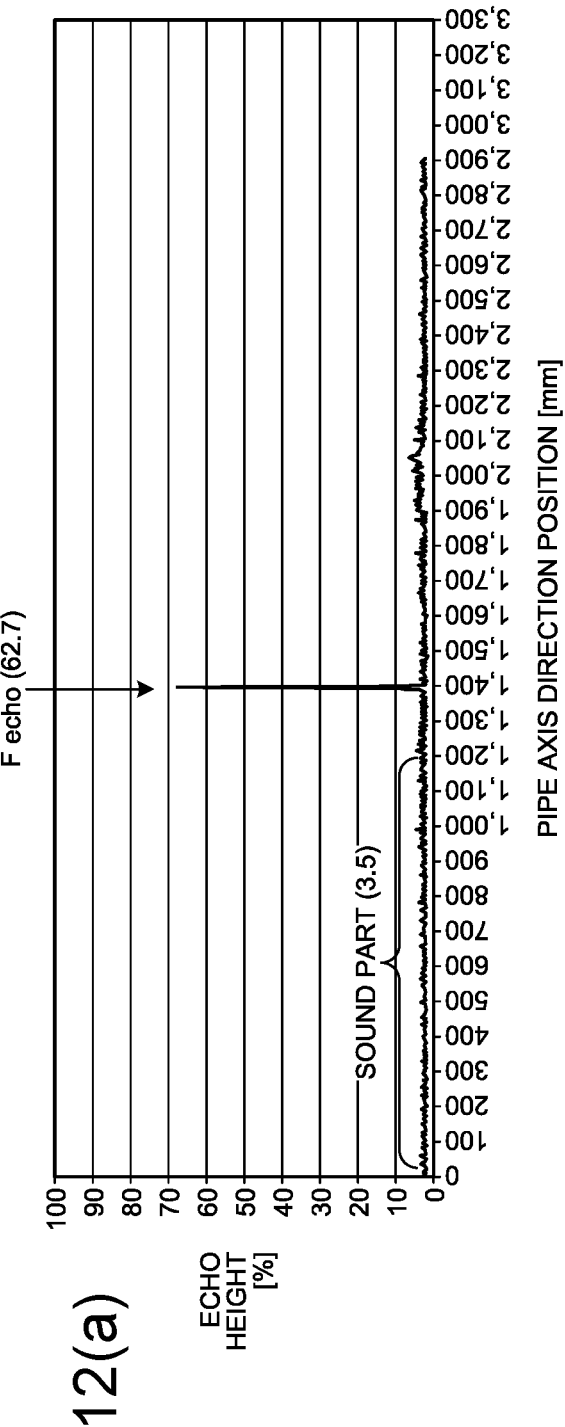
FIGS. 12(a) and 12(b) are diagrams illustrating an example of results of ultrasonic flaw detection.
Figure 12B:
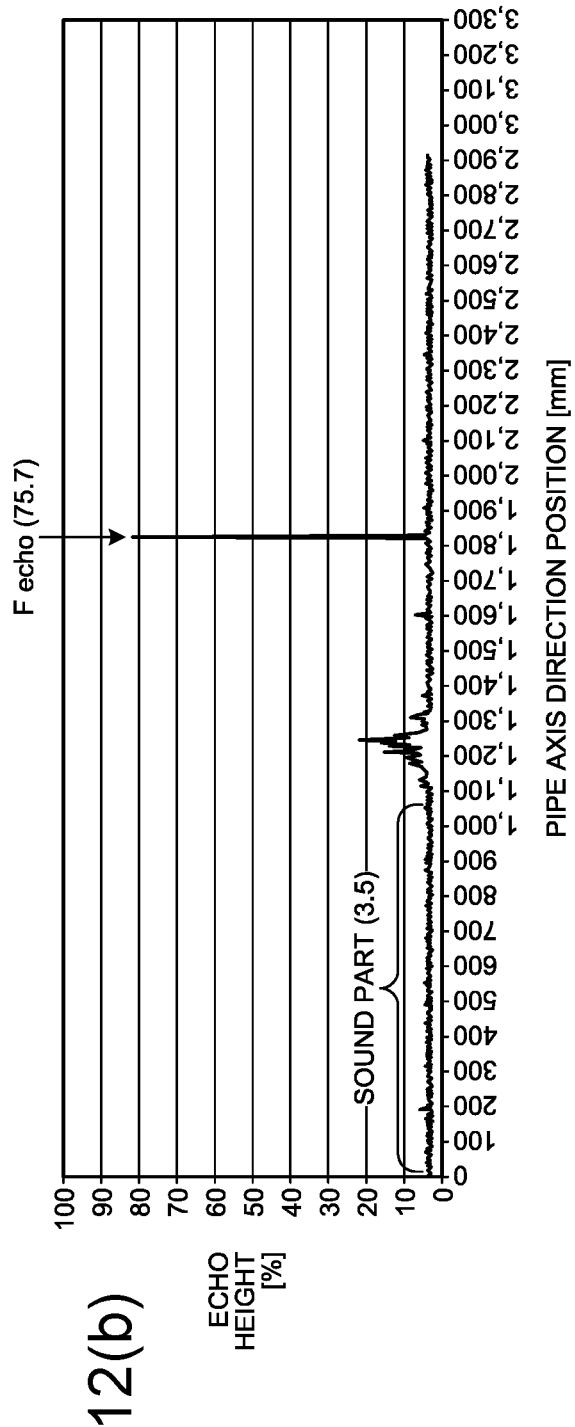
Figure 13A:
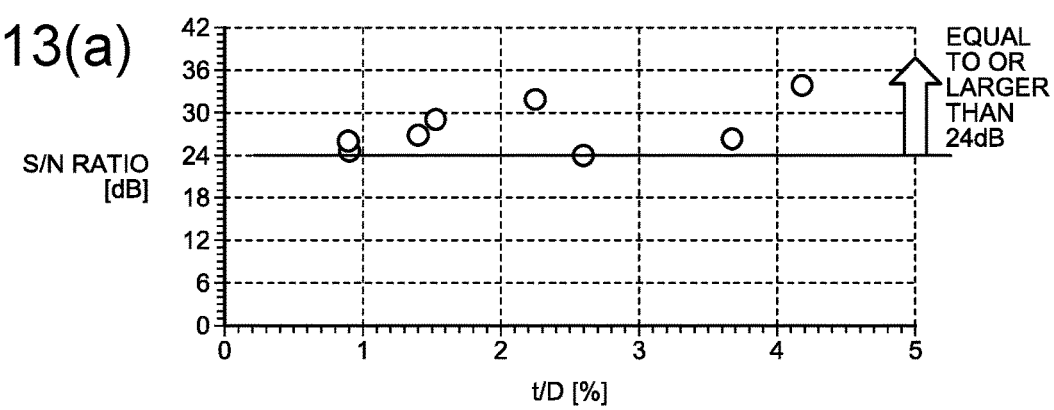
FIGS. 13(a) and 13(b) are diagrams illustrating an example of S/N ratios and refraction angles for welded steel pipes having different values of t/D.
Figure 13B:
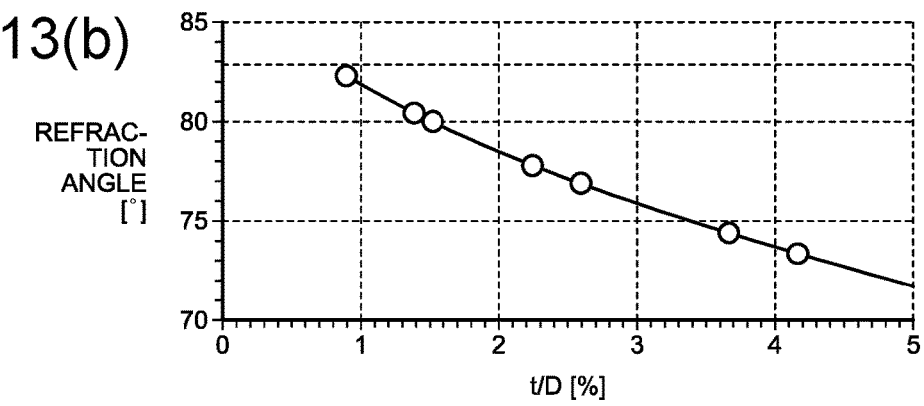
Figure 14:
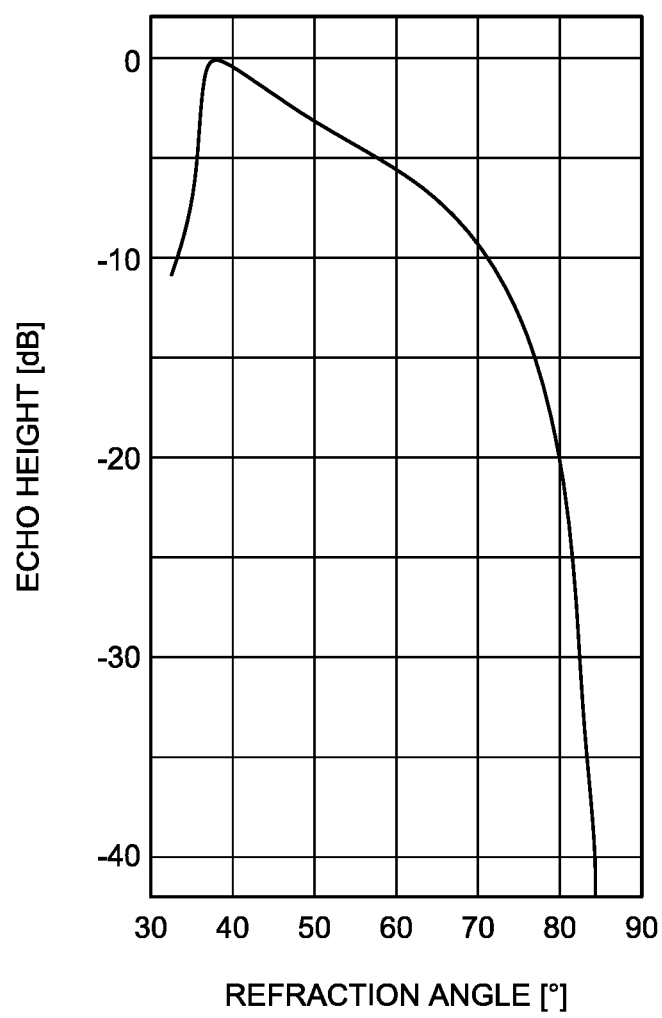
FIG. 14 is a diagram illustrating an example of a relation between refraction angle of ultrasonic waves and echo height.

An example of results of actual ultrasonic flaw detection are illustrated in FIGS. 12(a) and 12(b). Flaw detection (sector scanning) was performed with three ultrasonic beams that were at a 3° pitch with respect to a center refraction angle. FIGS. 12(a) and 12(b) respectively illustrate results (vertical axis: echo height, horizontal axis: pipe axis direction position) of flaw detection on a 12.7-mm welded steel pipe having an outer diameter of 56 inches and an artificial flaw (a flat bottomed hole) of ϕ3.0 mm preformed in its welded portion, by use of the matrix array probe 2A and the matrix array probe 2B. As illustrated in FIGS. 12(a) and 12(b), an F-echo was clearly observed with both of the matrix array probes 2A and 2B, and the artificial flaw of ϕ3.0 mm was able to be detected adequately. Further, FIGS. 13(a) and 13(b) illustrate S/N ratios and refraction angles in flaw detection on artificial flaws (flat bottomed holes) of ϕ3.0 mm formed in thickness center portions of welded steel pipes having different values of t/D. As illustrated in FIGS. 13(a) and 13(b), even when the refraction angle was as large as about 82°, a satisfactory S/N ratio equal to or larger than 24 dB was obtained. An S/N ratio generally required for an artificial flaw (a flat bottomed hole) of ϕ3.0 mm is equal to or larger than 12 dB.

The example has been described above, but this disclosure is not limited to the description and drawings forming a part of disclosure through this example. Any other configurations, examples, operation techniques, and the like implemented by those skilled in the art or the like based on the example are thus all included in the scope of this disclosure.

INDUSTRIAL APPLICABILITY

An ultrasonic flaw detection device and an ultrasonic flaw detection method that enable reduction of influence of change in incidence angle of ultrasonic waves on defect detection sensitivity and variation in the defect detection sensitivity due to manual adjustment by an operator, are able to be provided. Further, a method of manufacturing a welded steel pipe and a welded steel pipe quality control method that enable manufacture of a welded steel pipe having a welded portion that is high in quality by reduction of influence of change in incidence angle of ultrasonic waves on defect detection sensitivity and variation in the defect detection sensitivity due to manual adjustment by an operator, are able to be provided.

The invention claimed is:

1. An ultrasonic flaw detection device that detects a planar defect present at a butted portion of a groove in a welded portion of a welded steel pipe, the ultrasonic flaw detection device comprising:
   a matrix array probe arranged, via a wedge, at a position on an outer peripheral surface of the welded steel pipe, the position enabling ultrasonic waves to be vertically incident on a welding root surface, the matrix array probe configured to transmit ultrasonic waves focused in a pipe axis direction to the welding root surface, and receive ultrasonic waves reflected at the welding root surface;
   an ultrasonic wave transmitting and receiving unit that controls the matrix array probe such that the matrix array probe receives the reflected ultrasonic waves reflected at the welding root surface; and
   an evaluation unit that detects the planar defect based on the reflected ultrasonic waves received by the ultrasonic wave transmitting and receiving unit, wherein
   the matrix array probe has a plurality of vibration elements arranged lattice-like,
   an array pitch of the vibration elements in the pipe axis direction is larger than a wavelength of ultrasonic waves transmitted and received,
   widths of the vibration elements in the pipe axis direction decrease outward in the pipe axis direction from a pipe axis direction center position of the matrix array probe, and the widths and center coordinates of the vibration elements in the pipe axis direction have been adjusted such that all of ultrasonic waves from the vibration elements overlap in a focal position control range for the ultrasonic waves.

2. The ultrasonic flaw detection device according to claim 1, wherein the ultrasonic wave transmitting and receiving unit transmits ultrasonic waves to the welding root surface while changing, at a predetermined angle pitch, a refraction angle of the ultrasonic waves in a predetermined angle range around a predetermined center angle.

3. An ultrasonic flaw detection method comprising detecting a planar defect present at a butted portion of a groove in a welded portion of a welded steel pipe with the ultrasonic flaw detection device according to claim 2.

4. The ultrasonic flaw detection method according to claim 3, further comprising:
transmitting ultrasonic waves to an artificial planar defect formed at a center position of the welding root surface while changing, at an arbitrary angle pitch, a refraction angle of the ultrasonic waves in an arbitrary angle range;
receiving reflected waves of the ultrasonic waves reflected at the artificial planar defect; and
finding a refraction angle, at which the reflected waves of the ultrasonic waves are the highest in intensity, as the center angle.

5. The ultrasonic flaw detection method according to claim 4, further comprising:
preparing beforehand a plurality of wedges that differ in refraction angles; and
selecting, in detecting the planar defect, a wedge having a refraction angle closest to a desired refraction angle, and using the selected wedge in combination with the matrix array probe.

6. The ultrasonic flaw detection method according to claim 3, further comprising:
preparing beforehand a plurality of wedges that differ in refraction angles; and
selecting, in detecting the planar defect, a wedge having a refraction angle closest to a desired refraction angle, and using the selected wedge in combination with the matrix array probe.

7. A method of manufacturing a welded steel pipe, comprising:
detecting any planar defect present at a butted portion of a groove in a welded portion of a welded steel pipe with the ultrasonic flaw detection device according to claim 2; and
manufacturing the welded steel pipe based on a result of the detection.

8. A welded steel pipe quality control method, comprising:
detecting any planar defect present at a butted portion of a groove in a welded portion of a welded steel pipe with the ultrasonic flaw detection device according to claim 2; and
evaluating quality of the welded steel pipe based on a result of the detection.

9. An ultrasonic flaw detection method comprising detecting a planar defect present at a butted portion of a groove in a welded portion of a welded steel pipe with the ultrasonic flaw detection device according to claim 1.

10. The ultrasonic flaw detection method according to claim 9, further comprising:
transmitting ultrasonic waves to an artificial planar defect formed at a center position of the welding root surface while changing, at an arbitrary angle pitch, a refraction angle of the ultrasonic waves in an arbitrary angle range;
receiving reflected waves of the ultrasonic waves reflected at the artificial planar defect; and
finding a refraction angle, at which the reflected waves of the ultrasonic waves are the highest in intensity, as the center angle.

11. The ultrasonic flaw detection method according to claim 10, further comprising:
preparing beforehand a plurality of wedges that differ in refraction angles; and
selecting, in detecting the planar defect, a wedge having a refraction angle closest to a desired refraction angle, and using the selected wedge in combination with the matrix array probe.

12. The ultrasonic flaw detection method according to claim 9, further comprising:
preparing beforehand a plurality of wedges that differ in refraction angles; and
selecting, in detecting the planar defect, a wedge having a refraction angle closest to a desired refraction angle, and using the selected wedge in combination with the matrix array probe.

13. A method of manufacturing a welded steel pipe, comprising:
detecting any planar defect present at a butted portion of a groove in a welded portion of a welded steel pipe with the ultrasonic flaw detection device according to claim 1; and
manufacturing the welded steel pipe based on a result of the detection.

14. A welded steel pipe quality control method, comprising:
detecting any planar defect present at a butted portion of a groove in a welded portion of a welded steel pipe with the ultrasonic flaw detection device according to claim 1; and
evaluating quality of the welded steel pipe based on a result of the detection.

* * * * *